United States Patent
Ismael

(10) Patent No.: US 9,596,258 B2
(45) Date of Patent: Mar. 14, 2017

(54) SYSTEM, APPARATUS AND METHOD FOR USING MALWARE ANALYSIS RESULTS TO DRIVE ADAPTIVE INSTRUMENTATION OF VIRTUAL MACHINES TO IMPROVE EXPLOIT DETECTION

(71) Applicant: FireEye, Inc., Milpitas, CA (US)

(72) Inventor: Osman Abdoul Ismael, Palo Alto, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/042,489

(22) Filed: Sep. 30, 2013

(65) Prior Publication Data

US 2015/0096025 A1    Apr. 2, 2015

(51) Int. Cl.
G06F 21/56     (2013.01)
H04L 29/06     (2006.01)

(52) U.S. Cl.
CPC .......... *H04L 63/145* (2013.01); *G06F 21/566* (2013.01)

(58) Field of Classification Search
CPC ............. H04L 63/1416; H04L 63/1408; H04L 63/1491; G06F 21/554; G06F 21/56
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

IEEE Xplore Digital Library Sear Results for "*detection of unknown computer worms*". Http//ieeexplore.ieee.org/searchresult.jsp?SortField=Score&SortOrder=desc&ResultC . . . , (Accessed on Aug. 28, 2009).

(Continued)

*Primary Examiner* — Morshed Mehedi
*Assistant Examiner* — Shu Chun Gao
(74) *Attorney, Agent, or Firm* — Rutan & Tucker, LLP

(57) ABSTRACT

According to one embodiment, an electronic device comprises a memory to store information and a processor. The processor is adapted to receive information associated with content such as network traffic, to process the stored information and to conduct operations on the content. These operations may comprise determining, by a virtual machine processed by the processor, an occurrence of an event during malware analysis of an object associated with the content, and dynamically altering a virtual machine instrumentation of the virtual machine based on information associated with the event.

27 Claims, 9 Drawing Sheets

(56) References Cited

U.S. PATENT DOCUMENTS

| | | | |
|---|---|---|---|
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1* | 5/2012 | Spertus ..................... 717/158 |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1* | 8/2013 | Ranadive et al. ............... 726/24 |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |

(56) References Cited

U.S. PATENT DOCUMENTS

| | | |
|---|---|---|
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |

(56) References Cited

U.S. PATENT DOCUMENTS

| | | |
|---|---|---|
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1* | 6/2011 | Abramovici et al. ......... 726/30 |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1* | 9/2011 | Sawhney et al. ................ 726/1 |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |

(56) References Cited

U.S. PATENT DOCUMENTS

| | | | |
|---|---|---|---|
| 2013/0097706 A1* | 4/2013 | Titonis et al. | 726/24 |
| 2013/0111587 A1 | 5/2013 | Goel et al. | |
| 2013/0117852 A1* | 5/2013 | Stute | 726/23 |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0096025 A1 | 4/2015 | Ismael | |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012145066 | 10/2012 |
| WO | 2013/067505 A1 | 5/2013 |

OTHER PUBLICATIONS

AltaVista Advanced Search Results. "Event Orchestrator". Http://www.altavista.com/web/results?Itag=ody&pg=aq&aqmode= aqa=Event+Orchesrator . . . , (Accessed on Sep. 3, 2009).
AltaVista Advanced Search Results. "attack vector identifier". Http://www.altavista.com/web/results?Itag=ody&pg=aq&aqmode= aqa=Event+Orchestrator . . . , (Accessed on Sep. 15, 2009).
Cisco, Configuring the Catalyst Switched Port Analyzer (SPAN) ("Cisco"), (1992-2003).
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Excerpt regarding First Printing Date for Merike Kaeo, Designing Network Security ("Kaeo"), (2005).
The Sniffers's Guide to Raw Traffic available at: yuba.stanford. edu/~casado/pcap/section1.html, (Jan. 6, 2014).
NetBIOS Working Group. Protocol Standard for a NetBIOS Service on a TCP/UDP transport: Concepts and Methods. STD 19, RFC 1001 Mar. 1987.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails. jsp?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Aura, Tuomas, "Scanning electronic documents for personally identifiable information", Proceedings of the 5th ACM workshop on Privacy in electronic society. ACM, 2006.
Baecher,"The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cohen, M.I. , "PyFlag—An advanced network forensic investigation", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 SIGOPS Operating Systems Review, vol. 42 Issue 3, pp. 21-28.
Hjelmvik, Erik , "Passive Network Security Analysis with NetworkMiner", (IN)SECURE, Issue 18, (Oct. 2008), pp. 1-100.
Kaeo, Merike , "Designing Network Security", ("Kaeo"), (Nov. 2003).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-II), Boston, USA, (2003).
Kristoff, J. , "Botnets, Detection and Mitigation: DNS-Based Techniques", NU Security Day, (2005), 23 pages.
Liljenstam, Michael , et al., "Simulating Realistic Network Traffic for Worm Warning System Design and Testing", Institute for Security Technology studies, Dartmouth College ("Liljenstam"), (Oct. 27, 2003).
Marchette, David J., "Computer Intrusion Detection and Network Monitoring: A Statistical Viewpoint", ("Marchette")(2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.

(56) References Cited

OTHER PUBLICATIONS

Morales, Jose A., et al., "Analyzing and exploiting network behaviors of malware.", *Security and Privacy in Communication Networks*. Springer Berlin Heidelberg, 2010. 20-34.
Natvig, Kurt, "SANDBOXII: Internet", *Virus Bulletin Conference*, ("Natvig"), (Sep. 2002).
Newsome, J., et al., "Dynamic Taint Analysis for Automatic Detection, Analysis, and Signature Generation of Exploits on Commodity Software", In *Proceedings of the 12th Annual Network and Distributed System Security, Symposium (NDSS '05)*, (Feb. 2005).
Newsome, J., et al., "Polygraph: Automatically Generating Signatures for Polymorphic Worms", In *Proceedings of the IEEE Symposium on Security and Privacy*, (May 2005).
Nojiri, D., et al., "Cooperation Response Strategies for Large Scale Attack Mitigation", *DARPA Information Survivability Conference and Exposition*, vol. 1, (Apr. 22-24, 2003), pp. 293-302.
Peter M. Chen, and Brian D. Noble, "When Virtual is Better Than Real, Department of Electrical Engineering and Computer Science", University of Michigan ("Chen").
Silicon Defense, "Worm Containment in the Internal Network", (Mar. 2003), pp. 1-25.
Singh, S., et al., "Automated Worm Fingerprinting", *Proceedings of the ACM/USENIX Symposium on Operating System Design and Implementation*, San Francisco, California, (Dec. 2004).
Spitzner, Lance, "Honeypots: Tracking Hackers", ("Spizner"), (Sep. 17, 2002).
Thomas H. Ptacek, and Timothy N. Newsham, "Insertion, Evasion, and Denial of Service: Eluding Network Intrusion Detection", *Secure Networks*, ("Ptacek"), (Jan. 1998).
Venezia, Paul, "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek-.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].
Mori, Detecting Unknown Computer Viruses, 2004, Springer-Verlag Berlin Heidelberg.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT/US14/56834 filed Sep. 22, 2014 International Search Report and Written Opinion dated May 1, 2015.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM, APPARATUS AND METHOD FOR USING MALWARE ANALYSIS RESULTS TO DRIVE ADAPTIVE INSTRUMENTATION OF VIRTUAL MACHINES TO IMPROVE EXPLOIT DETECTION

FIELD

Embodiments of the disclosure relate to the field of data security. More specifically, one embodiment of the disclosure relates to a system, apparatus and method that use malware analysis results obtained during replay operations to dynamically adjust instrumentation of a virtual machine utilized for exploit detection.

GENERAL BACKGROUND

Over the last decade, malicious software (malware) has become a pervasive problem for Internet users. In some situations, malware is a program or file that is embedded within downloadable content and designed to adversely influence or attack normal operations of a computer. Examples of different types of malware may include bots, computer viruses, worms, Trojan horses, spyware, adware, or any other programming that operates within an electronic device (e.g., computer, tablet, smartphone, server, router, wearable technology, or other types of electronics with data processing capability) without permission by the user or an administrator.

One type of malware is distributed over a network via websites, e.g., servers operating on a network according to a hypertext transfer protocol (HTTP) standard or other well-known standard. Malware distributed in this manner may be actively downloaded and installed on a computer, without the approval or knowledge of its user, simply by the computer accessing the web site hosting the malicious network content (the "malicious web site").

Besides being in the form of malware-embedded objects associated with web pages hosted by the malicious web site, malware may also enter a computer on receipt or opening of an electronic mail (email) message. For example, email may contain a Uniform Resource Locator (URL) or an attachment, such as a Portable Document Format (PDF) document, with embedded malicious executable programs. Furthermore, malware may exist in files contained in a computer memory or storage device, having infected those files through any of a variety of attack vectors.

Various processes and devices have been employed to prevent the problems associated with malware. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time the scanning software detects malware, some damage on the computer or loss of privacy may have already occurred, and the malware may have propagated from the infected computer to other computers. Where the malware is polymorphic malware, which is capable of mutating to defect signature matching, antivirus scanning offers little protection.

Another type of malware detection solution employs a virtual environment that virtualizes the processing of data flows (e.g., series of related packets) within a sandbox environment. The sandbox environment comprises a virtual machine (VM) that conducts generic virtualized processing (sometimes referred to as "replay") operations on at least some content within a data flow in efforts to detect behavioral anomalies that may signal the presence of an exploit (e.g., a detected malicious attack by malware). For example, in response to detecting a timeout event where no exploit has manifested after a predetermined amount of time has elapsed, the VM may merely change its software profile and perform the same replay process. If an exploit is detected, however, and if processing time is still available, the same generic VM instrumentation will continue to run for the allotted time without any intelligence as to making run-time more efficient.

More specifically, the above-described malware detection solution is inefficient as the same replay process is used without considering the particular exploits targeted for detection, if any are specifically targeted, and/or without considering the results of an initial analysis or whether the analysis actually detected an exploits.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
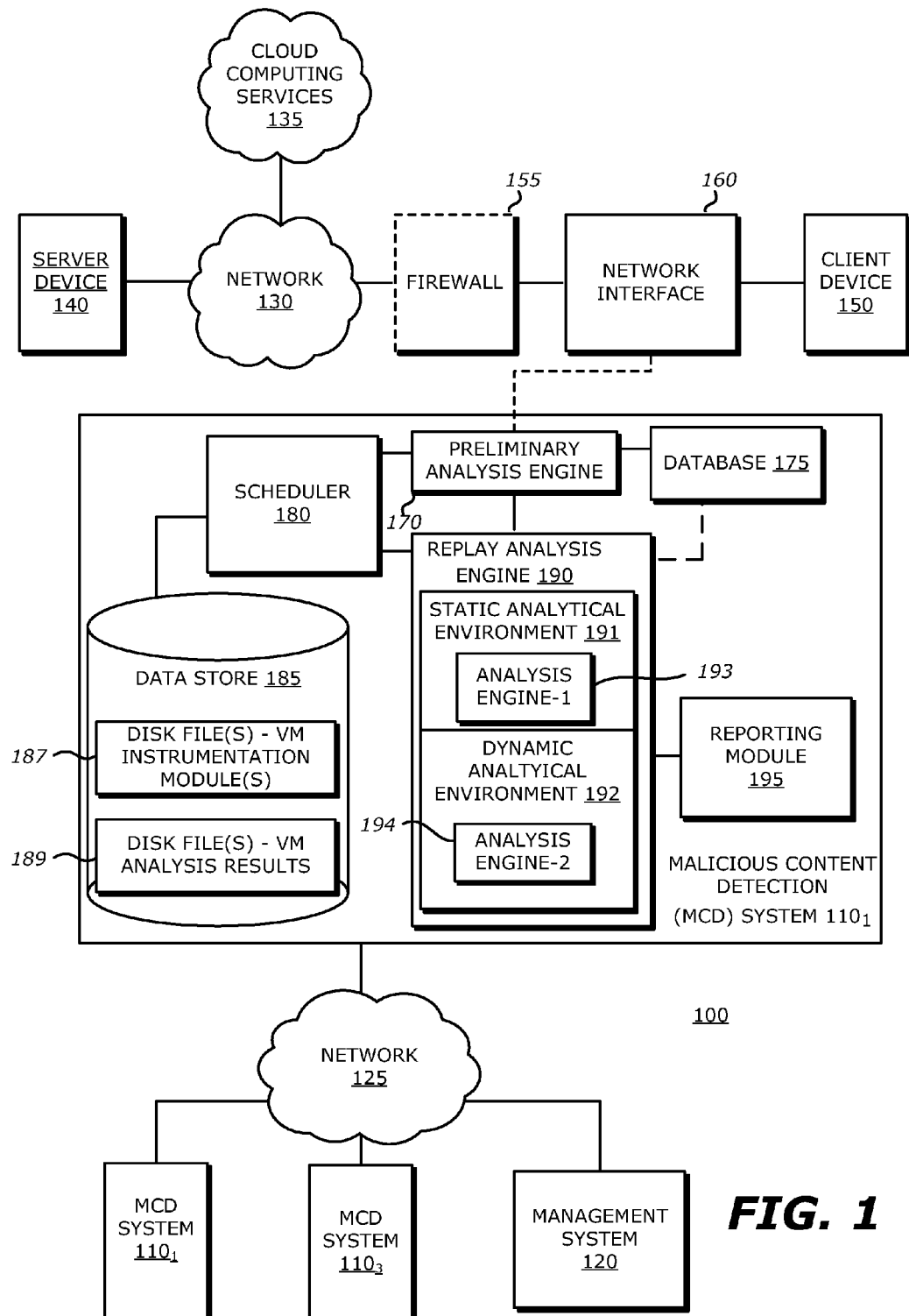
FIG. 1 is an exemplary block diagram of a communication system deploying a plurality of malware content detection (MCD) systems utilizing an embodiment of the invention.

Various embodiments of the disclosure relate to a malware content detection (MCD) system and a corresponding method for utilizing malware analysis results obtained during replay operations conducted by one or more virtual machines for exploit detection, where the malware analysis results are used to dynamically adjust instrumentation of the virtual machine(s) to achieve reduced configuration time and increased effectiveness in exploit detection.

In general, a "replay" operation is virtualized processing of an object by one or more virtual machines (VMs) within a sandboxed virtual environment in efforts to detect the presence of malware, where the object is associated with network traffic propagating over a network. Examples of an object may include content received over a network (e.g., Internet downloads), a file (e.g., PDF file, Flash file or other file type), a Uniform Resource Locator (URL) embedded within an electronic mail (email) message, data flow (e.g., series of related packets), or other types of content. Herein, a VM supplies malware analysis results produced during the replay operation to instrumentation control logic (e.g., logic implemented within a replay analysis engine which may be part of the VMM). The instrumentation control logic is responsible for dynamically altering the instrumentation of the VM based on the malware analysis results. In other words, the malware analysis results received by the instrumentation control logic are used to determine if/when a dynamic change of the VM instrumentation is to occur and perhaps the changed VM instrumentation. The dynamic change to the VM instrumentation comprises changing logic associated with a particular VM process in the VM, which is running as part of the host virtual system (e.g. at the Host layer), while preserving state so as to remain transparent to the guest virtual system (e.g. Guest layer) of the VM.

As this dynamic change of the VM instrumentation may be in response to detection of an exploit or a particular triggering event associated with on-going malware analysis results, a greater number of samples of content may be analyzed as well as the malware analysis may be conducted faster and more efficiently. In other words, VM instrumentation changes are conducted based on malware analysis results uncovered from prior virtual processing of, e.g., the network traffic in order to more promptly and more accurately target exploits that may be present in the network traffic. For instance, if behaviors associated with the virtual processing of binary code are being analyzed, instrumenting the VM to better target binary at the opcode level would greatly improve the accuracy of the malware analysis. Similarly, if behaviors associated with the processing of network traffic are being analyzed, altering VM instrumentation at the virtual device level (e.g., within VM processes of a VM) may provide more complete malware analysis. In sum, prompt and directed adjustment of VM instrumentation not only reduces configuration time so as to reduce the chances of any malware detecting that it is operating within a virtual environment, but also increases accuracy and effectiveness in exploit detection.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include hardware circuitry having data processing or storage functionality. Examples of such circuitry may include, but is not limited or restricted to a microprocessor, one or more processor cores, a programmable gate array, a microcontroller, an application specific integrated circuit, a digital signal processor, semiconductor memory, combinatorial logic, or the like.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information transmitted as one or more messages, where each message may be in the form of a packet, a frame, an Asynchronous Transfer Mode "ATM" cell, or any other series of bits having a prescribed format. The content may be received as a data flow, namely a group of related messages, within ingress network traffic.

Herein, content may include one or more types of data such as text, software, images, audio, metadata and/or other digital data. One example of content may include web content, or any data traffic that may be transmitted using a Hypertext Transfer Protocol (HTTP), Hypertext Markup Language (HTML) protocol, or may be transmitted in a manner suitable for display on a Web browser software application.

Another example of content includes electronic mail (email), which may be transmitted using an email protocol such as Simple Mail Transfer Protocol (SMTP), Post Office Protocol version 3 (POP3), or Internet Message Access Protocol (IMAP4). A further example of content includes an Instant Message, which may be transmitted using Session Initiation Protocol (SIP) or Extensible Messaging and Presence Protocol (XMPP) for example. Yet another example of content includes one or more files that are transferred using a data transfer protocol such as File Transfer Protocol (FTP) for subsequent storage on a file share.

The term "malware" is directed to software that produces an undesired behavior upon execution, where the behavior is deemed to be "undesired" based on customer-specific rules, manufacturer-based rules, and any other type of rules formulated by public opinion or a particular governmental or commercial entity. This undesired behavior may include a communication-based anomaly or an execution-based anomaly that would (1) alter the functionality of an electronic device executing an application software in a malicious manner; (2) alter the functionality of an electronic device executing that application software without any malicious intent; and/or (3) provide an unwanted functionality which is generally acceptable in other context.

In general, a "virtual machine" (VM) is a simulation of an electronic device (abstract or real) that is usually different from the electronic device conducting the simulation. A VM may include one or more VM processes where each VM process is based on specifications of a hypothetical electronic component (e.g., processor, network interface card "NIC"; storage device, etc.) so as to collectively emulate the architecture and functions of a real electronic device. For simplicity, one type of VM process, referred to as a "virtual device," may be a virtualization of an electronic device or an electronic component.

"VM instrumentation" refers to a software module configured for execution on a virtual machine (VM), where the software module controls and/or monitors virtualized operations conducted on an object associated with network traffic. These virtualized operations, which are representative of operations conducted by the virtual device, produce information from which behaviors may be determined. The detection of anomalous behaviors represent that the object is suspicious and may include malware. An assigned level of suspiciousness may be used to identify the likelihood that the object includes malware.

The term "transmission medium" is a communication path between two or more systems (e.g. any electronic devices with data processing functionality such as, for example, a security appliance, server, mainframe, computer, netbook, tablet, smart phone, router, switch, bridge or brouter). The communication path may involve wired, wireless and/or logical communications. Examples of wired and/or wireless communications include electrical wiring, optical fiber, cable, bus trace, or a wireless channel using infrared, radio frequency (RF), or any other wired/wireless signaling mechanism. An example of logical communication includes two software components in communication with each other, although they are not physically connected.

The term "computerized" generally represents that any corresponding operations are conducted by hardware in combination with software and/or firmware.

Lastly, the nomenclature "<item>(s)" denotes "one or more <items>" and the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause malware identifiers generated as a result of malware detection by any of MCD systems $110_1$-$110_N$ to be shared with one or more of the other MCD systems $110_1$-$110_N$ including, for example, where such sharing is conducted on a subscription basis. Additionally, the management system 120 may coordinate the sharing information associated with the VM instrumentation (described below) among the MCD systems $110_1$-$110_N$ in order to better refine malware analysis and detection.

Herein, according to this embodiment of the invention, first MCD system $110_1$ is an electronic device that is adapted to (i) receive network traffic that is routed over a communication network 130 between at least one server device 140 and at least one client device 150 and (ii) monitor, in real-time, content within the network traffic. More specifically, first MCD system $110_1$ may be configured to inspect content received via communication network 130 and identify "suspicious" objects. An object is identified as "suspicious" when it is assessed by a preliminary analysis engine 170, with a certain level of likelihood, that at least one characteristic identified during inspection of the object indicates the presence of malware.

Thereafter, the "suspicious" object is scheduled by scheduler 180 to be analyzed within a replay analysis engine 190. Replay analysis engine 190 provides a static analytical environment 191 and/or a dynamic analytical environment 192.

The static analytical environment 191 comprises a first analysis engine 193 that is adapted to conduct static malware detection operations, such as comparisons between binary content from the network traffic and suspected malware identifiers (e.g. alphanumeric patterns associated with known or suspected malware, etc.) for example. The dynamic analytical environment 192 comprises a second analysis engine 194, which includes at least instrumentation control logic operating in concert with VM(s) as described herein. The second analysis engine 194 is adapted to detect whether the suspicious object may include malware by execution of one or more VMs that are configured to simulate the receipt and/or processing of the object under analysis ("analyzed object") targeted for the client device 150. The second analysis engine 194 analyzes the resultant behaviors monitored within the VM. These may include "expected" behaviors (e.g., those typically resulting from processing objects of the type being analyzed) and "unexpected" (or "anomalous") behaviors, and may represent those behaviors that would have occurred if the targeted client device 150 processed the object, and these behaviors are provided as malware analysis results to logic within replay analysis engine 190. Examples of anomalous behavior may include, but are not limited or restricted to unexpected network transmissions, unexpected changes in performance, or the like.

In response to the malware analysis results, instrumentations of the VM may be altered in a manner that is transparent to the virtualized operating system of the VM so as to re-configure the VM for continued or subsequent analysis, e.g., focused on a particular exploit or family of exploits that are more likely to be present within the network traffic based on the malware analysis results already provided.

Herein, first analysis engine 192 and the second analysis engine 194 may operate on the analyzed content concurrently or may operate on the analyzed content sequentially. For sequential operations, the first analysis engine normally performs static analysis on the analyzed content prior to the second analysis engine 194 performing dynamic analysis on that content.

According to this embodiment of communication system 100, first MCD system $110_1$ may be a web-based security appliance that is configured to inspect ingress data traffic, identify whether content associated with the data traffic may include malware, and if so, conduct a deeper analysis of the content. This deeper analysis is conducted in the replay analysis engine 190 to detect anomalous and undesired behaviors that would be present if the data traffic were actually processed by an electronic device such as client device 150. The particulars of this analysis are described below.

The communication network 130 may include a public computer network such as the Internet, in which case an optional firewall 155 (represented by dashed lines) may be interposed between communication network 130 and client device 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (sometimes referred to as a "tap" or "network tap") that is configured to receive data traffic propagating to/from the client device 150 and provide content from the data traffic to the first MCD system $110_1$.

According to one embodiment of the disclosure, the network interface 160 is configured to receive and copy content from the network traffic targeted for client device 150 normally without an appreciable decline in performance by the server device 140, the client device 150, or the communication network 130. The network interface 160 may copy any portion of the content, for example, any number of data packets. According to another embodiment of the disclosure, the network interface 160 is an in-line device that intercepts and routes the content, being some or all of the network traffic, to first MCD system $110_1$. Where the network traffic does not contain suspicious object, the network traffic is returned back to the network interface 160 for re-routing to the targeted destination (e.g., client device 150).

In some embodiments, the network interface 160 may capture metadata from network traffic intended for client device 150, where the metadata is used to determine the software profile and particular VM instrumentation(s) for the VM(s), if further malware analysis is needed. The metadata may be associated with the server device 140 and/or the client device 150. In other embodiments, preliminary analysis logic 170 (described herein) may obtain or generate the metadata associated with the network traffic.

It is contemplated that, for any embodiments where the first MCD system $110_1$ is implemented as an dedicated appliance or a dedicated electronic device, the network interface 160 may include an assembly integrated into the appliance or networking logic that includes network ports, network interface card or the like. The integrated assembly or networking logic provides coupling to the communication network 130 in order to non-disruptively "tap" network traffic propagating through firewall 155 and provide the network traffic (or a copy thereof) to the preliminary analysis logic 170. In other embodiments, the network interface 160 can be integrated into an intermediary device in the communication path (e.g. in firewall 155, router, switch or other network device) or can be a standalone component, such as an appropriate commercially available network tap. In virtual environments, a virtual tap (vTAP) can be used to duplicate traffic from virtual networks.

Referring still to FIG. 1, the first MCD system $110_1$ comprises preliminary analysis logic 170, a database 175, a scheduler 180, a data store 185, replay analysis engine 190 and a reporting module 195. In some embodiments, the network interface 160 may be contained within the first MCD system $110_1$. Also, preliminary analysis logic 170, scheduler 180 and/or replay analysis engine 190 may be software modules executed by a processor that receives the suspicious object, performs malware analysis and is adapted to access one or more non-transitory storage mediums operating as database 175, data store 185 and/or reporting module 195. In some embodiments, the preliminary analysis engine 170 may be one or more software modules executed by a processor, and the scheduler 180 and the replay analysis engine 190 may be one or more software modules executed by a different processor, where the two processors are possibly located at geographically remote locations, and communicatively coupled for example via a network.

In general, the preliminary analysis engine 170 serves as a filter to permit subsequent malware analysis only on certain portions of the incoming content, which effectively conserves system resources and provides faster response time in determining the presence of malware within analyzed object(s). As an ancillary benefit, by analyzing only a portion of incoming content that may have "exploits" (e.g. one or more objects, referred to as "object(s)," that may be exploited by malware), a greater number of VMs (and VM processes) may be supported to run concurrently with each other.

As illustrated in FIG. 1, according to one embodiment of the disclosure, the preliminary analysis logic 170 receives a copy of content associated with network traffic from the network interface 160 and conducts operations in accordance with rules stored in database 175 to determine if any of the content includes "suspicious" objects. The preliminary analysis logic 170 may examine an object within the content without executing or opening the object.

For example, the preliminary analysis logic 170 may examine the attributes (and/or metadata) for content associated with an object in order to determine whether the object originated from a blacklisted, malicious server, malicious web site, or originated from a region (or networking device) that is providing a high level of content having malware. Also, the preliminary analysis logic 170 may examine the content itself to determine whether such content includes objects that have a higher probability of including malware than other objects (e.g., attached files in email messages, embedded URLs, etc.). According to one embodiment of the disclosure, the preliminary analysis logic 170 flags "suspicious" objects.

Thereafter, according to one embodiment of the invention, the preliminary analysis logic 170 may be adapted to transmit at least a portion of the metadata or attributes associated with the suspicious object, which, for example, identifies the type of software (e.g., browser, email reader, or document reader) that the object requires to be processed, and, in some cases, identifies attributes of the targeted client device 150, to scheduler 180. The metadata and/or attributes are used by the scheduler 180 to determine the software profile(s) for the VM(s) as well as the VM instrumentation(s) needed for processing the suspicious object in the sandboxed virtual environment.

More specifically, scheduler 180 comprises queues and logic for identifying the type of object targeted for replay (e.g. HTTP traffic, PDF files, Flash files, etc.), identifying the software profile and VM instrumentation needed for the VM, and determining when the object is ready for processing in the dynamic analytical (virtual) environment of the replay analysis engine 190. In another embodiment of the disclosure, the replay analysis engine 190 may be adapted to receive one or more messages (e.g. data packets) from the preliminary analysis logic 170 and analyze the message(s) to identify what VM(s) is(are) to be deployed. Replay analysis engine 190 would provide signaling to scheduler 180 to retrieve the VM(s) with particular VM instrumentation(s).

For instance, as an illustrative example, the suspicious content under analysis may include an email message that was generated, under control of Windows® 8 Operating System, using a certain version (ver. X) of Windows® Outlook. The email message further includes a Portable Document Format (PDF) attachment in accordance with a particular version (ver. Y) of Adobe® Acrobat®. Upon determining that the email message includes a suspicious object, preliminary analysis logic 170 provides software profile information to scheduler 180 to identify a particular type of VM instrumentation needed to conduct malware analysis of the suspicious object. According to this illustrative example, the software profile information would include (1) Windows® 8 Operating System (OS); (2) Windows® Outlook, version X; and (3) PDF support through Adobe® Acrobat®, version Y.

Thereafter, the scheduler 180 conducts a search as to whether any of the VM disk files 187 within data store 185 features a particular VM instrumentation to process the suspicious object in accordance with the above-identified OS and one or more applications. If so, the scheduler 180 creates a VM with a VM process having the corresponding VM instrumentation. However, if the data store 185 does not feature a software profile supporting the above-identified OS and application(s), the scheduler 180 may simply ignore the VM request or may retrieve a VM image that is based on a similar software profile. For example, the scheduler 180 may receive a VM based on the same OS but a different version of a targeted application (e.g., Adobe® Acrobat® version "Z". Alternatively, the scheduler 180 may receive the same OS along with an application different from the targeted application but having similar functionality (e.g. different type of browser, etc.). As another alternative, the scheduler 180 may receive a different OS with a similar architecture.

Figure 2:
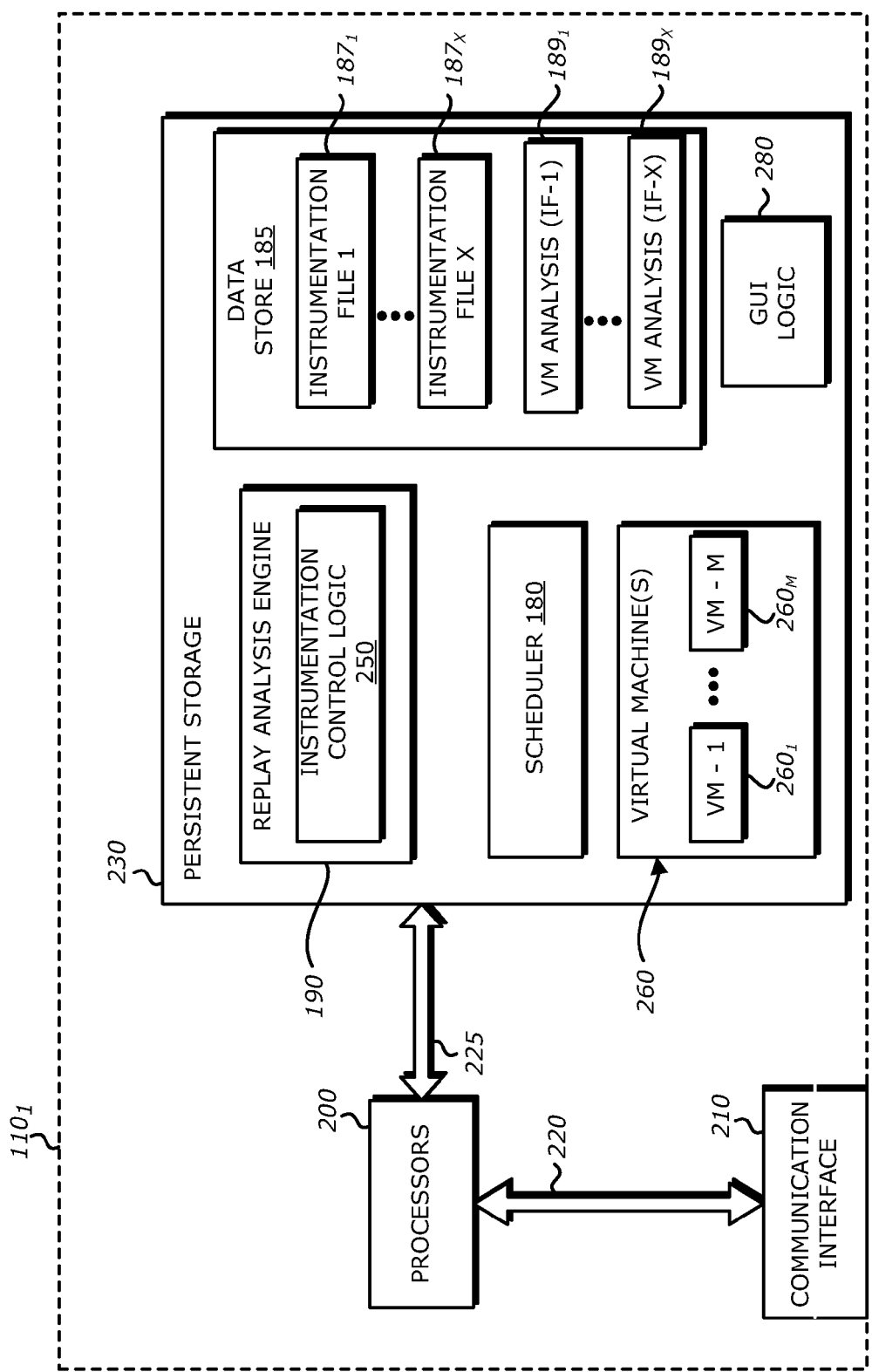
FIG. 2 is a second exemplary block diagram of the MCD system of FIG. 1.

During run-time, a VM provides malware analysis results to instrumentation control logic 250 of FIG. 2, which analyzes the malware analysis results and, in response to identifying an event, notifies the VM to request a different instrumentation. The event may include detection of an exploit through analysis of the malware analysis results or perhaps an occurrence of an anomalous behavior, for example, a first timeout condition (e.g., a predetermined period of run-time has elapsed). Hence, the instrumentation control logic 250 dynamically alters a VM process within the VM to implement a different VM instrumentation in order to optimize subsequent exploit detection processes.

The data store 185 is configured to store one or more VM disk files 187, where each VM disk file 187 includes a VM instrumentation. Capable of being pre-stored, uploaded and/ or erased automatically via management system 120 or locally uploaded by an administrator, the VM instrumentations provide different functionality to increase the likelihood of detecting potential exploits. For example, a first VM disk file may include a first VM instrumentation directed to analysis of JavaScript® code in accordance with a first type of JavaScript® engine and a second VM disk file may include a second VM instrumentation directed to deeper-level analysis of JavaScript® code in accordance with a different type of JavaScript® engine.

The dynamic alteration of the VM instrumentation is directed to select a new VM instrumentation that may be directed to a recently detected exploit (or family of exploits) that commonly causes or is related to characteristics associated with anomalous behavior identified in the malware analysis results (e.g., unusual network transmissions, unusual changes in performance, etc.). In fact, some VM instrumentations may be directed to detecting the same or related exploit types but feature different functionality (e.g. faster processing, specifically targeted processing, different software components, etc.).

The replay analysis engine 190 may flag a suspicious object as malware according to the observed anomalous behavior detected by the VM. The reporting module 195 may issue alerts indicating the presence of malware, and using pointers and other reference information, identify what portion of the "suspicious" object may contain malware. Additionally, the malicious server, e.g., server device 140, or malicious website, may be added to a list of malicious network content providers, and future network transmissions originating from the server device 140 may be blocked from reaching their intended destinations, e.g., by firewall 155.

Of course, in lieu of or in addition to MCD systems $110_1$-$110_N$, it is contemplated that cloud computing services 135 may be implemented with the replay analysis engine 190 to conduct VM-based dynamic analysis on one or more objects within the network traffic, perform dynamic changes in VM instrumentation and/or store and provide VM instrumentations as needed, as described herein.

III. Exemplary Embodiment of MCD System Configuration

Referring now to FIG. 2, an exemplary block diagram of logic associated with MCD system $110_1$ is shown. MCD system $110_1$ comprises one or more hardware processors 200 (e.g., one or more microprocessors, processor cores, digital signal processors, application specific integrated circuits "ASICs", microcontrollers, and/or programmable logic) that are coupled to communication interface logic 210 via a first transmission medium 220. Communication interface logic 210 enables communications with other MCD systems $110_2$-$110_N$ and management system 120 of FIG. 1. According to one embodiment of the disclosure, communication interface logic 210 may be implemented as a physical interface including one or more ports for wired connectors or may constitute a virtual interface. Additionally, or in the alternative, communication interface logic 210 may be implemented with one or more radio units for supporting wireless communications with other electronic devices.

Processor 200 is further coupled to persistent storage 230 via transmission medium 225. According to one embodiment of the disclosure, persistent storage 230 comprises a scheduler 180 and a replay analysis engine 190 that may be logic within a controller. Herein, the controller may be implemented as part of a VM monitor (VMM), also referred to as a hypervisor for managing or monitoring VMs, which may be hosted by a host operating system "OS" (not shown).

Replay analysis engine 190 comprises instrumentation control logic 250 which includes logic that are adapted to analyze malware analysis results received from one or more VMs $260_1$-$260_M$ (M≥1) during run-time. Such analysis is directed to optimizing performance of exploit detection processes conducted by the VMs $260_1$-$260_M$. Such optimization is accomplished by the instrumentation control logic 250 causing a dynamic change in the instrumentation of a VM (e.g., VM $260_1$) while preserving the state of operation as perceived by the guest operating system.

According to one embodiment of the disclosure, the dynamic change may be accomplished by changing an implementation of a VM process (e.g. virtual device). More specifically, the dynamic change may be accomplished by changing a pointer to at least particular function for the virtual device that is utilized by the VM, while preserving both the state of the virtual device associated with the VM and the defined operation for the particular function. The defined operation may be provided from opcode associated with the particular function (sometimes referred to as the "specification"). As an illustrative example, the dynamic change may alter a pointer to a particular function (e.g. ADD function) to now point to a second VM instrumentation (e.g. a second ADD function for the virtual device associated with the VM) in lieu of the first VM instrumentation (e.g. a first ADD function for the virtual device associated with the VM). Both VM instrumentations are directed to the same specification (e.g. ADD data in register R1 and register R2 and store the result in register R3), but the second VM instrumentation includes additional functionality not found in the first VM instrumentation.

According to one embodiment of the disclosure, the dynamic change of the VM instrumentation (VM instrumentation $187_1$->VM instrumentation $187_X$, X≥2) is triggered by instrumentation control logic 250 detecting an event, such as a detected behavior that may be associated with a particular exploit or exploit type for example, and thereafter, signaling the VM $260_1$ (or the scheduler 180 directly) to re-configure itself with one or more VM instrumentations directed to further detection of the particular exploit or exploit type.

In order to convey the malware analysis results $189_1$-$189_X$ stored in data store 185, which may include the file names, URLs, server DNS names or the like associated with suspicious exploits, processor(s) 200 may invoke GUI logic 280. GUI logic 280 provides one or more screen displays for conveying a more detailed summary of potentially malicious content being detected by MCD system $110_1$.

It is contemplated that multiple VMs $260_1$-$260_i$ (1<i≤M) may concurrently or sequentially perform malware analyses on the same suspicious object or, for that matter, on different suspicious objects. According to one embodiment of the disclosure, each of these multiple VMs $260_1$-$260_i$ may be associated with a different virtual device and/or may have different VM instrumentations. The analysis results in any of the multiple VMs $260_1$-$260_i$ may cause a new VM to be instantiated with a different instrumentation package/program or may cause/trigger one of the other VMs $260_1$-$260_i$ to interrupt its analysis to permit new instrumentation for one of this VM processes (virtual devices) to be provided.

IV. Exemplary Logical Embodiments of the Virtual Machine(s)

Figure 3:
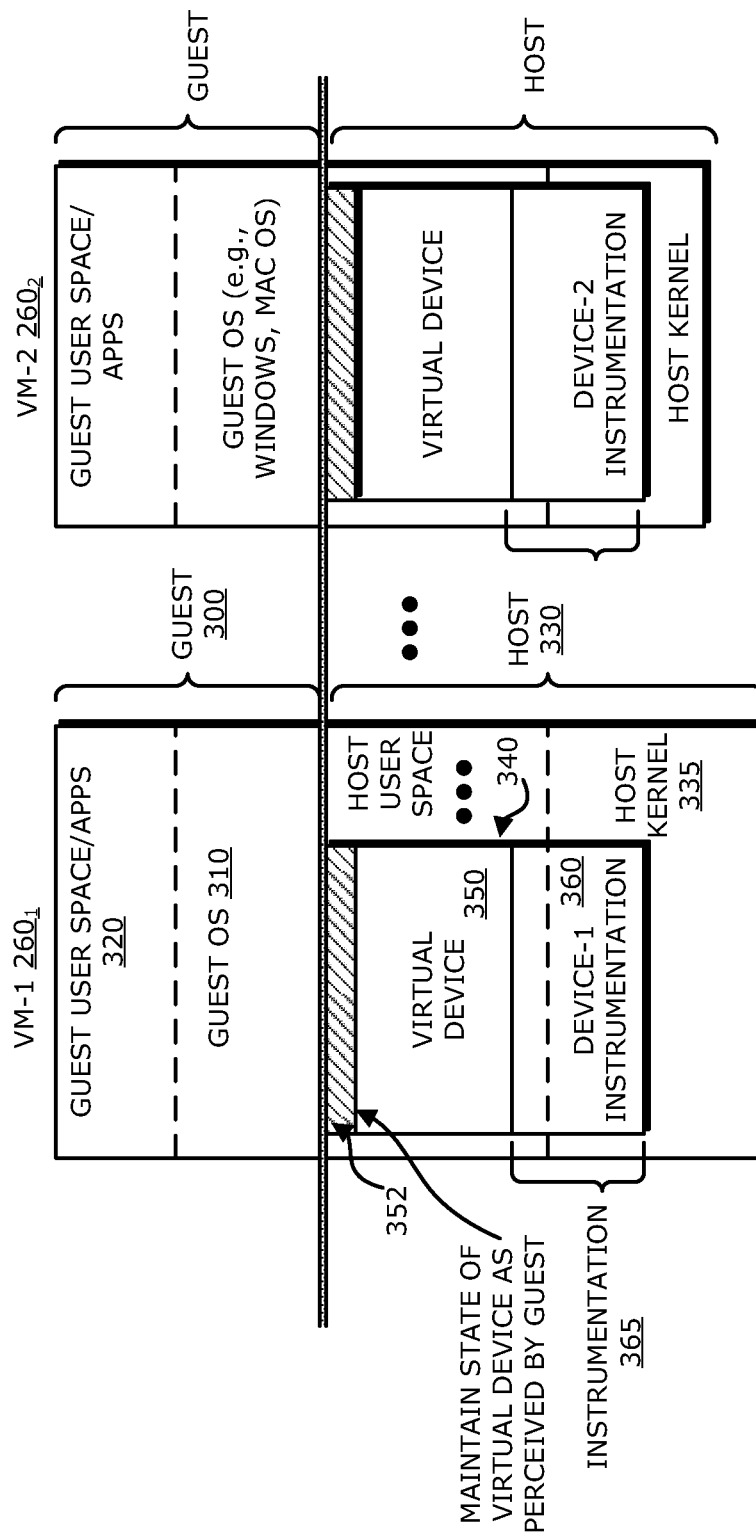
FIG. 3 is a block diagram of logical representations for virtual machines deployed within the replay analysis logic of the MCD system of FIG. 2.

Referring to FIG. 3, a block diagram of logical representations for virtual machines VM $260_1$ and VM $260_2$ is shown. VM $260_1$ comprises a guest virtual system 300 and a host virtual system 330. According to one embodiment of the disclosure, the guest virtual system 300 (hereinafter "Guest") is logic (e.g., a software module) of the VM $260_1$ that comprises Guest OS 310 and Guest application(s) 320. Guest OS 310 may include an independent instance of an operating system such as Windows®, MAC® OS, LINUX® or the like. Guest application(s) 320 includes associated virtualized software applications such as Adobe® Acrobat®, Explorer®, Mozilla®, Word® and other data processing applications. The host virtual system 330 (hereinafter "Host") comprises one or more VM processes 340, where each VM process 340 operates as virtualized hardware in providing one or more computing resources (e.g. processing, storage, network connectivity, etc.) to Guest 300.

VM process 340 comprises a first logic portion (e.g. software component) 350 and a second logic portion 360. First logic portion 350 comprises a first interface 352 (e.g. set of instructions and/or one or more registers) for Guest 300 and enables guest 300 to visualize hardware where the physical implementation of the hardware is located at a Host kernel 335. The first interface 352 is static in nature so as to preserve state information associated with the VM process 340 as perceived by the guest 300.

In contrast, the second logic portion 360 comprises a VM instrumentation 365, which is executable software that controls and/or monitors operations associated with the virtual device 350. These virtualized operations may be used to monitor behavior of suspicious objects being executed on the Guest 300 during virtualized use the virtual device 350. The VM instrumentation 365 further provides an interface to physical resources associated with the virtualized computing resources.

As an example, VM instrumentation 365 may be a software component that is configured to monitor for a certain event (e.g., access to a particular address range in memory by the CPU) and issues an alert in response to each memory access. This monitoring and issuance of alerts is independent from the Guest application (e.g. Adobe® Acrobat) running on the Guest 300, where the process may be executing "suspicious" objects from intercepted network traffic. As the state of operation for the process is preserved, when no further tracking is desired based on detection of the event, the VM instrumentation 365 can be dynamically changed while the Guest application continues to run. The VM instrumentation on the VM is adjusted transparent to the Guest 300 to optimize exploit detection associated with a particular exploit monitored, such as heap spray for example.

Figure 4A:
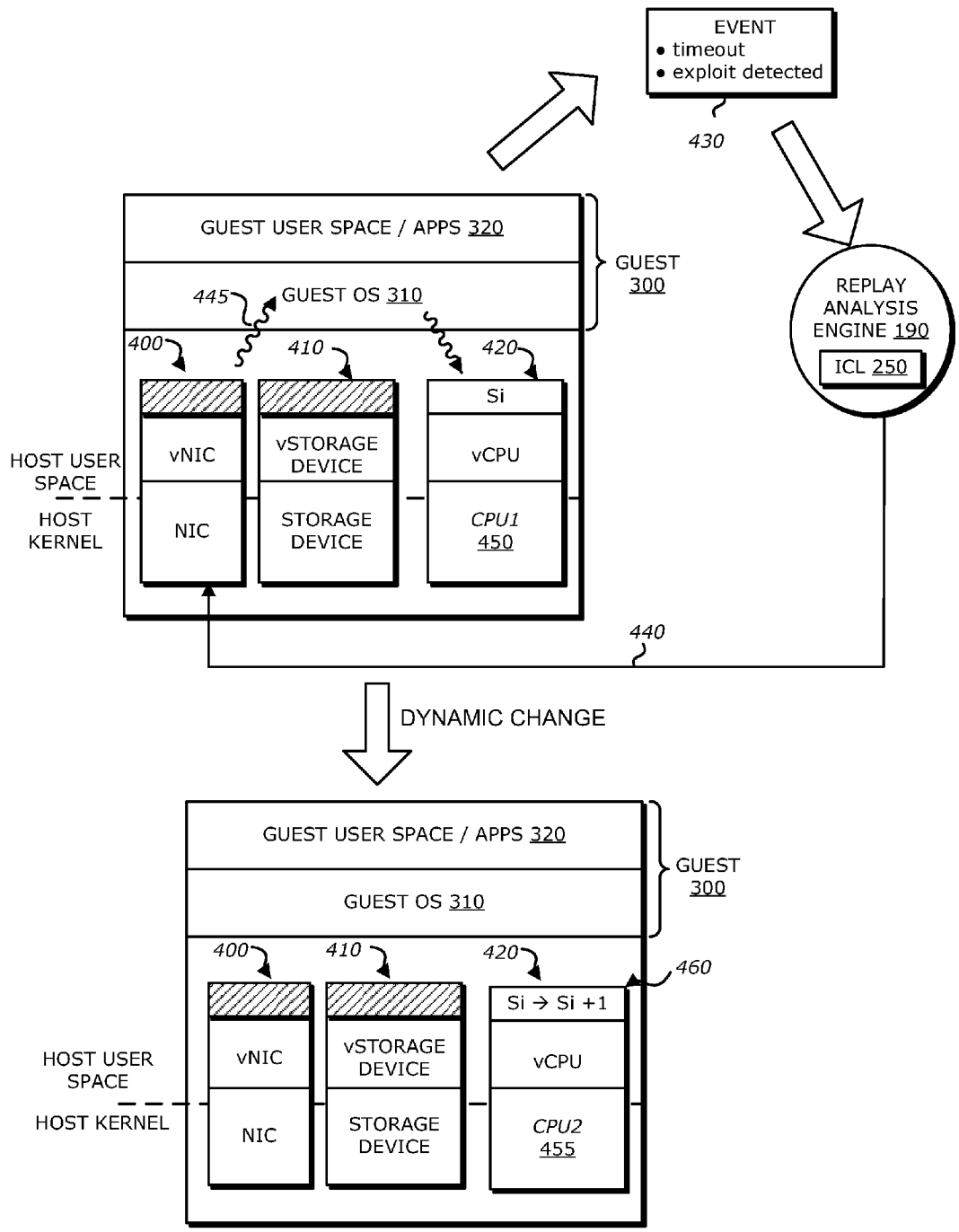
FIG. 4A is a first embodiment of virtual machine (VM) conducting virtualized operations that produce an event that causes the VM instrumentation for one of the VM processes to dynamic change transparent to the Guest.

Referring now to FIG. 4A, a first embodiment of virtual machine (VM) $260_1$ conducting virtualized operations that produce an event that causes the VM instrumentation for one of the VM processes to dynamically change in a manner transparent to the Guest 300 is shown. Herein, the virtual devices include a virtual network interface card (vNIC) 400, a virtual storage device (vStorage device) 410 and a virtual central processing unit (vCPU) 420, where vNIC 400 is adapted to receive certain types of network traffic (e.g. data packets) for replay while vStorage device 410 is adapted to receive other types of network traffic (e.g., PDF files and/or URLs) for replay. The malware analysis results generated by VM $260_1$ may include an event 430 that prompts instrumentation control logic 250 within replay analysis engine 190 to cause a dynamic change of the VM instrumentation (CPU1->CPU2) for vCPU 420.

Herein, vNIC 400 of the VM $260_1$ receives content 440 representative of network traffic (e.g. data representative of data packets) from replay analysis engine 190 during replay operations. vNIC 400 translates the received content 440 into a representation 445 (e.g., data frame) that is utilized by Guest 300 and issues an interrupt (not shown) to Guest 300 of the presence of read data. One type of interrupt may be a Direct Memory Access (DMA) request to the Guest OS 310. The translated data frame 445 is pushed onto the network stack for the Guest OS 310 and the data frame is subsequently processed by the vCPU 420 for a particular Guest application 320, where the output associated with the particular Guest application 320 becomes part of the malware analysis results provided to the instrumentation control logic 250.

In response to receipt of an event (e.g. timeout, exploit instrumented by VM instrumentation (CPI1), etc.), the instrumentation control logic 250 issues signaling to the VM $260_1$ to dynamically change its VM instrumentation from a first VM instrumentation (CPU1) 450 to a second VM instrumentation (CPU2) 455. Such signaling may be a single command to the VM $260_1$ or may involve a message that includes address or other information that identifies the second VM instrumentation (CPU2) 455 stored in the data store. This dynamic change of the VM instrumentation occurs transparently to Guest 300 as represented by a change in operating state 460 from a first state (Si) to an immediately subsequent state (Si+1).

Figure 4B:
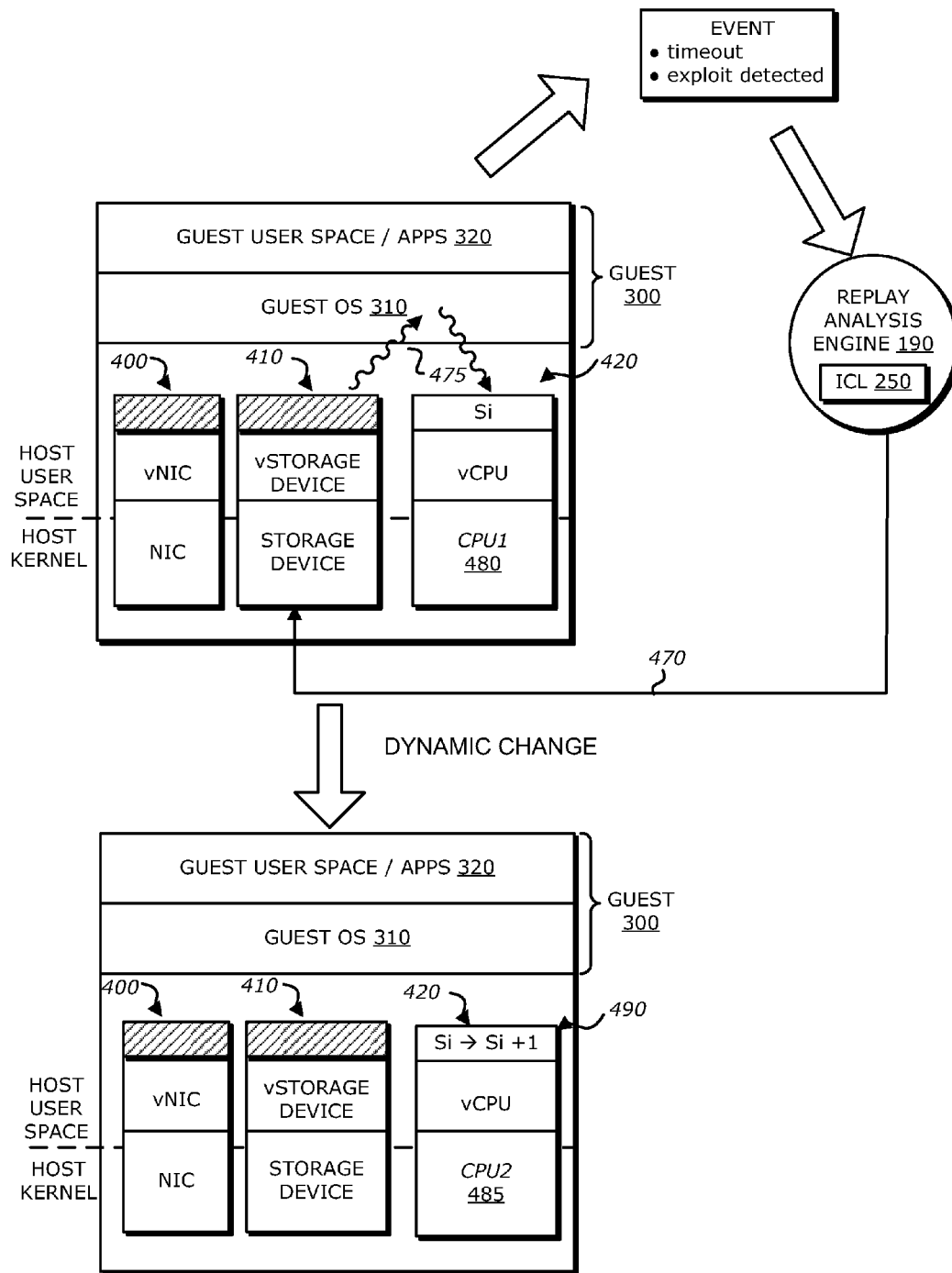
FIG. 4B is a second embodiment of virtual machine (VM) conducting virtualized operations that produce an event that causes the VM instrumentation for one of the VM processes to dynamic change transparent to the Guest.

Referring now to FIG. 4B, a second embodiment of a virtual machine (VM) $260_1$ conducting virtualized operations that produce an event that causes the VM instrumentation for one of the VM processes to dynamically change in a manner transparent to the Guest 300 is shown, as the operational state of the changed VM process (vCPU) is maintained during the change and the interface between the VM processes and the Guest 300 remain unaltered. As similarly shown in FIG. 4A, the virtual devices include vNIC 400, vStorage device 410 and vCPU 420, where vStorage device 410 is a virtual representation of any type of storage device (e.g., Universal Serial Bus "USB" device; digital versatile disc "DVD" player; compact disc "CD" player; etc.) that is adapted to receive PDF files and/or URLs from replay analysis engine 190 for replay.

Herein, vStorage device 410 of the VM $260_1$ receives one or more objects 470 (e.g., PDF file, URL, etc.) attached to or embedded within email messages, which are part of the analyzed content from replay analysis engine 190 provided to the VM $260_1$ during replay operations. In response to receiving a PDF file, logic (e.g. software component) within vStorage device 410 generates a first interrupt to Guest OS 310 that prompts execution by vCPU 420 of the Guest application 320 that will process data 475 representative of the PDF file stored within vStorage device 410. For a URL, however, vStorage device 410 features logic (e.g., software component) that generates a second interrupt to the Guest OS 310 to prompt execution by vCPU 420 of a guest browser application for the uploaded URL.

In response to receipt of an event (e.g. timeout, exploit instrumented by a first VM instrumentation (CPI1) 480, the instrumentation control logic 250 issues signaling to the VM $260_1$ to dynamically change its VM instrumentation to a second VM instrumentation (CPU2) 485. This dynamic change of the VM instrumentation occurs transparently to Guest 300 as represented by a change in operating state 490 from a first state (Si) to an immediately subsequent state (Si+1).

V. Exemplary Inter-Communications for Dynamically Changing a VM Instrumentation

Figure 5:
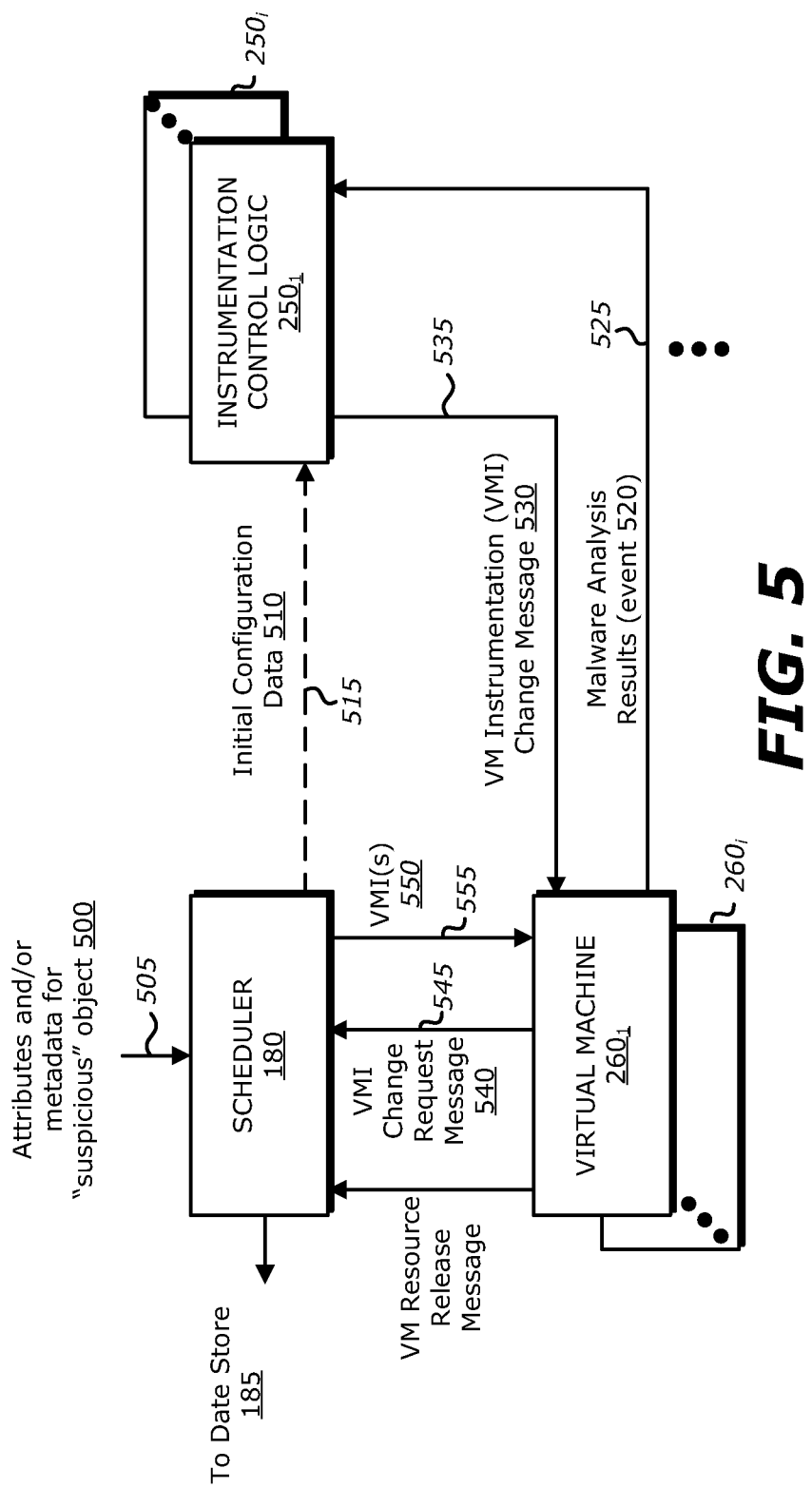
FIG. 5 is an exemplary diagram of the inter-communications between logic controlling dynamic alteration of the VM instrumentation for a particular VM.

Referring to FIG. 5, an exemplary diagram of the inter-communications between logic controlling dynamic alteration of the VM instrumentation for a particular VM is shown. Herein, the scheduler 180 receives information 500 (e.g., attributes and/or metadata) associated with "suspicious" object via communication path 505. Based on information 500, the scheduler 180 retrieves one or more VMs $260_1$-$260_i$ (i≥1) from data store 185 (e.g., causes the one or more VMs $260_1$-$260_i$ to be configured) and the VM(s) $260_1$-$260_i$ are used for virtual analysis of the "suspicious" object.

According to one embodiment of the disclosure, based on information 500 associated with the suspicious object, the scheduler 180 may be configured to retrieve the VM(s) $260_1$-$260_i$ along with their corresponding instrumentation control logic $250_1$-$250_i$. However, in lieu of retrieval by scheduler 180, instrumentation control logic $250_1$-$250_i$ may be pre-installed logic within replay analysis engine 190 or may be generated and loaded into the replay analysis engine 190 by other logic. As yet an alternative embodiment, a single instrumentation control logic may be configured to operate as a centralized monitoring agent for events from multiple VMs.

Upon commencing configuration of a virtual environment for processing the suspicious content, as an optional feature, the scheduler 180 may be adapted to upload initial VM configuration data 510 to instrumentation control logic $250_1$-$250_i$ via communication path 515. The initial VM configuration data 510 comprises information that defines the initial state for each of the installed VM(s) $260_1$-$260_i$. For instance, initial VM configuration data 510 provided to instrumentation control logic $250_1$ may include a starting state for VM $260_1$. Additionally or in the alternative, initial VM configuration data 510 may include data representative of the current VM instrumentation(s) utilized by VM processes within the VM $260_1$. Such representative data may be used by the instrumentation control logic $250_1$ to determine an alternative VM instrumentation based on a first event 520 received from VM $260_1$ via communication path 525.

In response to detection of an event, instrumentation control logic $250_i$ may generate a VM Instrumentation (VMI) Change message 530 via communication path 535. The VMI Change message 530 may include a command that, upon receipt, causes the VM $260_i$ to generate a VMI Change Request message 540 to be provided to the scheduler 180 via communication path 545. Alternatively, the VMI Change message 530 may include information that identifies a particular VM instrumentation to be substituted by VM $260_i$ for the current VM instrumentation. Receipt of the VMI Change Request message 540 causes the scheduler 180 to retrieve and load one or more VM instrumentations (VMI(s) 550 identified in message 540 via communication path 550.

Figure 6:
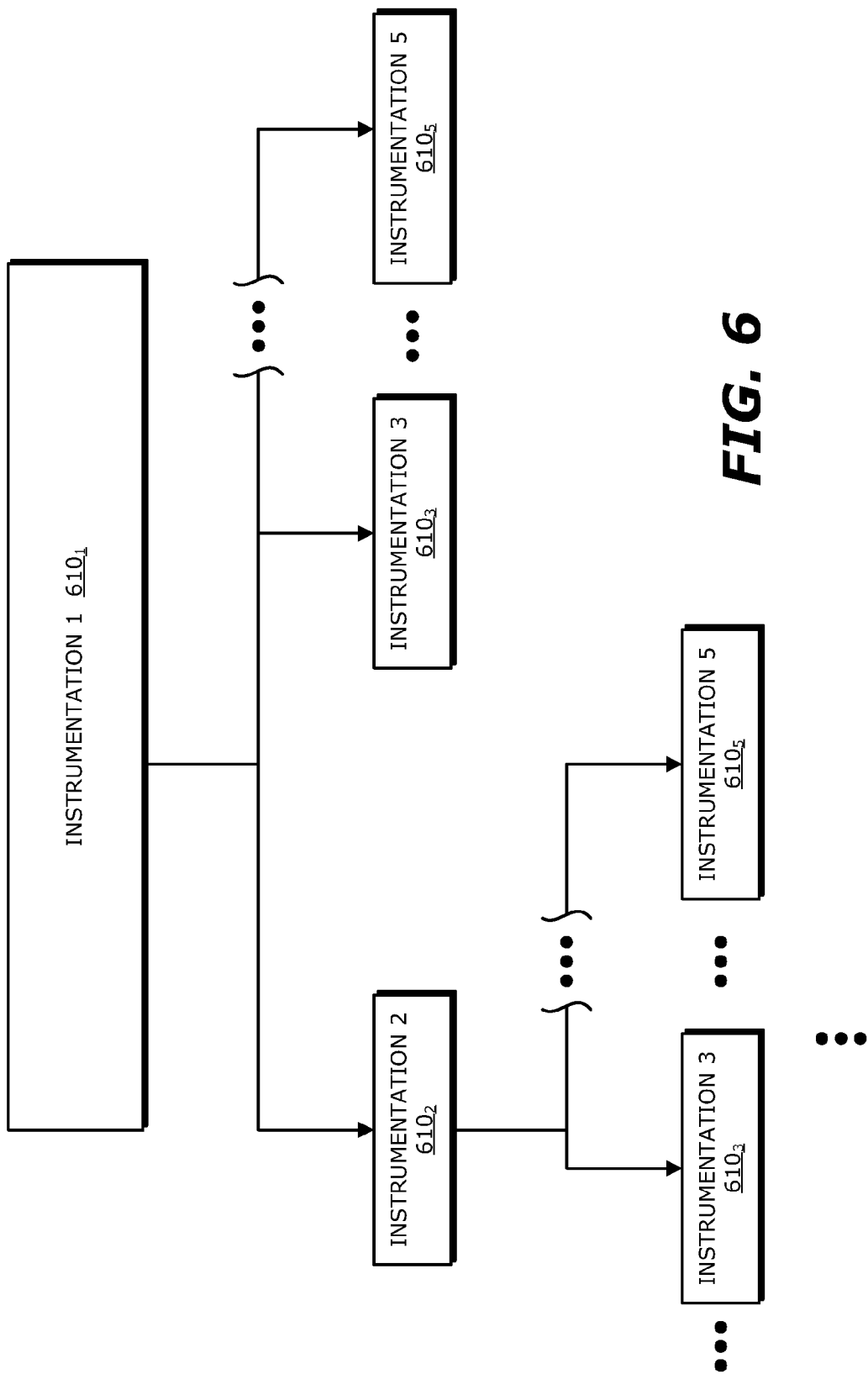
FIG. 6 is an exemplary diagram of a VM instrumentation hierarchy controlled by the instrumentation control logic.

Referring to FIG. 6, an exemplary diagram of a VM instrumentation hierarchy controlled by the instrumentation control logic is shown. Herein, the VM associated with the instrumentation control logic 250 is provided with a first VM instrumentation $610_1$. Upon receipt of an event, the instrumentation control logic is permitted to dynamically change the VM instrumentation. Based on the type of event detected (e.g., type of exploit detected, timeout, etc.), the instrumentation control logic selects from "R−1" potential VM instrumentations $610_2$-$610_R$ (R≥2, where R=5 for this illustrative example). As shown, second VM instrumentation $610_1$ is selected and an associated change is requested by the VM.

Similarly, upon receipt of another event, the instrumentation control logic is permitted to dynamically change the VM instrumentation. Again, based on the type of event detected (e.g., type of exploit detected, timeout, etc.), the instrumentation control logic selects from four potential VM instrumentations $610_1$ and $610_3$-$610_5$. As shown, third VM instrumentation $610_3$ is selected and an associated change is requested by the VM. The process continues until the VM allocated time for execution has elapsed or the results of the VM analysis warranted early termination.

VI. Exemplary Illustrations of Instrumentation Dynamic Alteration of VM

Figure 7:
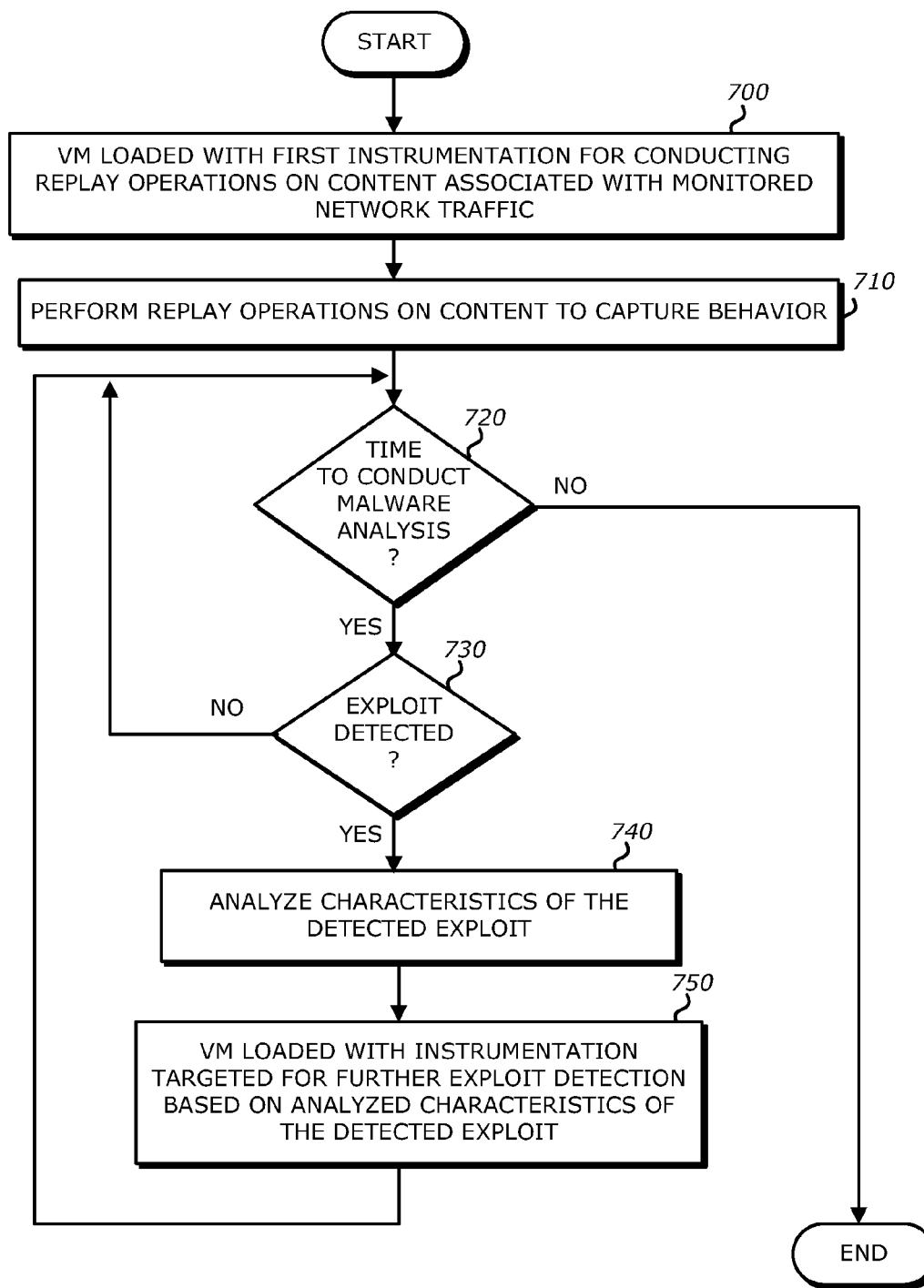
FIG. 7 is a flowchart partially illustrating operations for dynamically altering a VM instrumentation for a particular VM.

Referring to FIG. 7, a flowchart partially illustrating operations for dynamically altering a VM instrumentation for a particular VM is shown. Herein, a virtual machine (VM) is loaded with a first VM instrumentation for conducting replay operations on content associated with monitored network traffic (block 700). Thereafter, replay operations are scheduled to be performed on the content to capture behaviors (block 710).

In the event that there is sufficient time for the VM to conduct malware analysis on the content (block 720). If insufficient time is available to conduct the malware analysis, the adaptive VM instrumentation alternation mechanism is halted (block 760). If there is sufficient time to conduct the malware analysis and an exploit is detected, the characteristics of the detected exploit are analyzed (blocks 730 and 740). Based on these characteristics, the VM is subsequently loaded with a VM instrumentation targeted for further malware analysis that may be directed to the type of exploit or exploit types having some correlation with the detected exploit (block 750).

Figure 8:
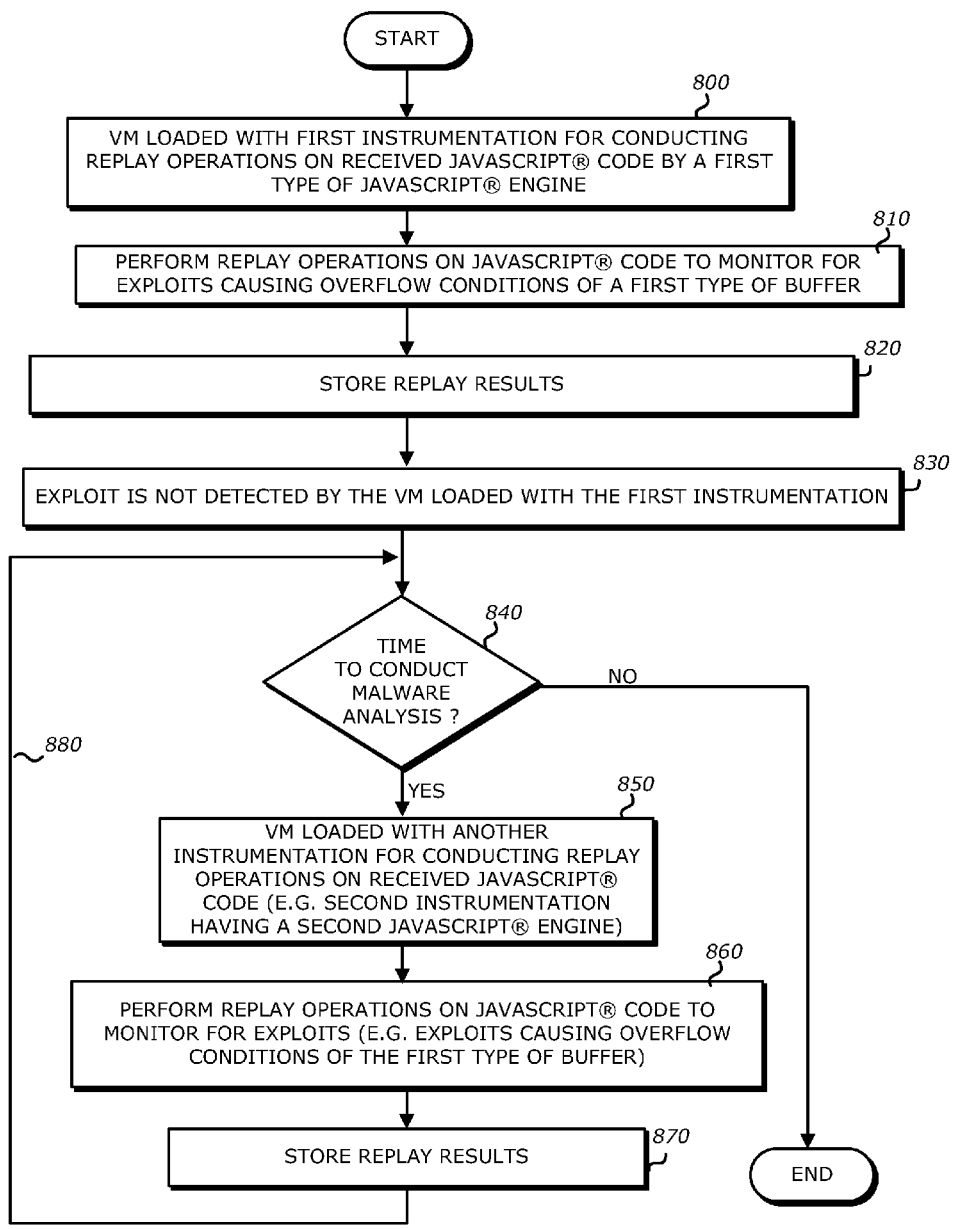
FIG. 8 is a flowchart partially illustrating operations for dynamically altering from a first VM instrumentation directed to a first JavaScript® code analysis process to a second VM instrumentation directed to a second JavaScript® code access process.

Referring now to FIG. 8, a flowchart partially illustrating operations for dynamically altering from a first VM instrumentation directed to a first JavaScript® code analysis process to a second VM instrumentation directed to a second JavaScript® code access process is shown. Herein, a virtual machine (VM) is loaded with a first VM instrumentation for conducting replay operations on received JavaScript® code using a first type of JavaScript® engine (block 800). Thereafter, malware analysis operations are performed by the first JavaScript® engine within the first VM instrumentation to monitor for an exploit causing an overflow condition of a first type of buffer (block 810). For example the first type of buffer may be an x86 stack buffer. Thereafter, the VM analysis results are stored (block 820).

Upon failing to detect the exploit being monitored, in the event that the VM allotted processing time has not elapsed, the VM is subsequently loaded with a second VM instrumentation for conducting replay operations replay operations on received JavaScript® code using a second type of JavaScript® engine (blocks 830, 840 and 850). Thereafter, malware analysis operations are performed by the second JavaScript® engine within the second VM instrumentation to monitor for an exploit causing an overflow condition of the first type of buffer (block 860). Thereafter, the VM analysis results are stored (block 870).

Upon detecting the exploit, in the event that the VM allotted processing time has not elapsed, the VM may be subsequently loaded with another VM instrumentation for conducting more detailed malware analysis directed to the detected exploit. However, upon failing to detect the exploit being monitored, in the event that the VM allotted processing time still has not elapsed, the VM is subsequently loaded with another VM instrumentation with perhaps another JavaScript® engine (block 880).

In the foregoing description, the invention is described with reference to specific exemplary embodiments thereof. It will, however, be evident that various modifications and changes may be made thereto without departing from the broader spirit and scope of the invention as set forth in the appended claims. For instance, in lieu of or in addition to the MCD system 110₁-110₃ of FIG. 1, a malware analysis described above may be conducted within firewall or other components within the communication network that is adapted to conduct dynamic alternation of the VM instrumentation of a VM based on VM analysis results.

What is claimed is:

1. A computerized method comprising:
    determining, by a virtual machine being executed by hardware circuitry, an event that has occurred during a malware analysis of an object and the malware analysis includes an analysis of characteristics associated with anomalous behavior of the object during execution of the object within the virtual machine, the virtual machine includes a guest virtual system and a host virtual system; and
    dynamically altering at least a host kernel space of an instrumentation of the virtual machine by the hardware circuitry based on information associated with the event, the dynamic altering of the virtual machine instrumentation comprises changing an instrumentation of a virtual device of the virtual machine from a first instrumentation of the virtual device to a second instrumentation of the virtual device while preserving a state of the virtual device as perceived by the guest virtual system, wherein the second instrumentation of the virtual device being different from the first instrumentation of the virtual device,
    wherein the event comprises a detected behavior that is associated with a particular exploit or a particular exploit type.

2. The computerized method of claim 1, wherein the hardware circuitry comprises one or more processors.

3. The computerized method of claim 1, wherein the second instrumentation of the virtual device being downloaded from a cloud computing service.

4. The computerized method of claim 1, wherein the virtual machine instrumentation comprises logic that performs one of a plurality of virtualized operations including (i) controlling virtualized operations conducted on the object associated with content that includes network traffic and (ii) monitoring the virtualized operations conducted on the object.

5. The computerized method of claim 1, wherein determining of the event during malware analysis of the object further comprises (i) performing a replay operation on the object and (ii) analyzing the characteristics associated with the anomalous behavior if an exploit associated with the object is detected during the replay operation.

6. The computerized method of claim 1, wherein the characteristics associated with the anomalous behavior comprises at least one of unexpected network transmissions from an electronic device that comprises the hardware circuitry and unexpected changes in performance by the electronic device.

7. A computerized method comprising:
    determining, by a virtual machine being executed by hardware circuitry, an event that has occurred during a malware analysis of an object and the malware analysis includes an analysis of characteristics associated with anomalous behavior of the object during execution of the object within the virtual machine, the virtual machine includes a guest virtual system and a host virtual system; and
    dynamically altering at least the host virtual system of an instrumentation of the virtual machine by the hardware circuitry based on information associated with the event, the dynamically altering of the virtual machine instrumentation comprises changing an instrumentation of a virtual device of the virtual machine running as part of the host virtual system from a first instrumentation of the virtual device to a second instrumentation of the virtual device while preserving a state of the virtual device as perceived by the guest virtual system, wherein the second instrumentation of the virtual device being different from the first instrumentation of the virtual device,
    wherein the event comprises a detected behavior that is associated with a particular exploit or a particular exploit type.

8. The computerized method of claim 1 further comprising conducting malware analysis on the object using the virtual machine having the changed instrumentation for the at least one VM process.

9. The computerized method of claim 1, wherein dynamically altering of the virtual machine instrumentation comprises interrupting a virtual machine (VM) replay to change an instrumentation for at least one virtual machine (VM)

process of the virtual machine during malware analysis of a second object different from the object, where the object and the second object are part of the same data flow.

10. An electronic device comprising:
a memory to store information;
a processor adapted to receive information associated with network traffic, the processor to process the stored information and conduct operations on the network traffic, the operations comprise (i) determining, by a virtual machine processed by the processor, an occurrence of an event during malware analysis of an object and the malware analysis includes an analysis of characteristics associated with anomalous behavior of the object during execution of the object within the virtual machine that includes a guest virtual system and a host virtual system, and (ii) dynamically altering at least a host kernel space of an instrumentation of the virtual machine based on information associated with the event, the dynamic altering of the virtual machine instrumentation comprises changing an instrumentation of a virtual device of the virtual machine from a first instrumentation of the virtual device to a second instrumentation of the virtual device while preserving a state of the virtual device as perceived by the guest virtual system, wherein the second instrumentation of the virtual device being different from the first instrumentation of the virtual device,
wherein the event comprises a detected behavior that is associated with a particular exploit or a particular exploit type.

11. The electronic device of claim 10, wherein the second instrumentation of the virtual device being downloaded from a cloud computing service.

12. The electronic device of claim 10, wherein the virtual machine instrumentation comprises logic that performs one of a plurality of virtualized operations including (i) controlling virtualized operations conducted on the object associated with content received over a network and (ii) monitoring the virtualized operations conducted on the object.

13. The electronic device of claim 10, wherein the processor determines the event during malware analysis of the object associated with network traffic by (i) performing a replay operation on the object and (ii) analyzing characteristics associated with anomalous behavior if an exploit associated with the object is detected during the replay operation.

14. The electronic device of claim 13, wherein the characteristics associated with anomalous behavior comprises at least one of unusual network transmissions from the electronic device and unusual changes in performance by the electronic device.

15. The electronic device of claim 10, wherein the processor further dynamically altering of the virtual machine instrumentation by at least changing subsequent operations of the virtual machine, running as part of a host virtual system in the electronic device, for detecting exploits associated with the network traffic while preserving state so as to remain transparent to a guest virtual system of the electronic device.

16. The electronic device of claim 10, wherein the processor further dynamically altering the virtual machine instrumentation so that the virtual machine conducts subsequent analysis on a particular exploit or a family of exploits that are more likely to be present within the network traffic based on prior malware analysis results.

17. The electronic device of claim 10, wherein the processor further dynamically altering of the virtual machine instrumentation comprises interrupting a virtual machine (VM) replay to at least (i) change an instrumentation for at least one virtual machine (VM) process of the virtual machine during malware analysis of the object and (ii) change the instrumentation during malware analysis of a second object different from the object, where the object and the second object are part of the same data flow.

18. The electronic device of claim 10, wherein the processor further conducting malware analysis on the object using the virtual machine having the changed instrumentation for the at least one VM process.

19. An electronic device comprising:
a memory to store information;
a processor adapted to receive information associated with network traffic, the processor to process the stored information and conduct operations on the network traffic, the operations comprise (i) determining, by a virtual machine processed by the processor, an occurrence of an event during malware analysis of an object and the malware analysis includes an analysis of characteristics associated with anomalous behavior of the object during execution of the object within the virtual machine that includes a guest virtual system and a host virtual system, and (ii) dynamically altering the host virtual system associated with an instrumentation of the virtual machine based on information associated with the event, the dynamic altering of the virtual machine instrumentation comprises at least changing an instrumentation of a virtual device of the virtual machine from a first instrumentation of the virtual device to a second instrumentation of the virtual device while preserving a state of the virtual device as perceived by the quest virtual system, wherein the second instrumentation of the virtual device being different from the first instrumentation of the virtual device,
wherein the event comprises a detected behavior that is associated with a particular exploit or a particular exploit type.

20. The electronic device of claim 19, wherein the detection of an exploit during the analysis of the characteristics associated with anomalous behavior of the object during execution of the object within the virtual machine comprises a detection of an exploit causing an overflow condition of a first type of buffer.

21. The electronic device of claim 19, wherein the processor further dynamically altering of the virtual machine instrumentation by at least changing subsequent operations of the virtual machine, running as part of the host virtual system in the electronic device, for detecting exploits associated with the network traffic while preserving the state of the virtual device so as to remain transparent to the guest virtual system of the electronic device.

22. The electronic device of claim 19, wherein the processor further dynamically altering the virtual machine instrumentation so that the virtual machine conducts subsequent analysis on a particular exploit or a family of exploits that are more likely to be present within the network traffic based on prior malware analysis results.

23. The electronic device of claim 19, wherein the processor further dynamically altering of the virtual machine instrumentation comprises interrupting a virtual machine (VM) replay to at least (i) change an instrumentation for at least one virtual machine process of the virtual machine during malware analysis of the object and (ii) change the instrumentation during malware analysis of a second object different from the object, where the object and the second object are part of the same data flow.

24. The electronic device of claim 19, wherein the second instrumentation of the virtual device having additional functionality from functionality provided by the first instrumentation of the virtual device.

25. The electronic device of claim 19, wherein the second instrumentation of the virtual device being downloaded from a cloud computing service.

26. The electronic device of claim 19, wherein the virtual machine instrumentation comprises logic that performs one of a plurality of virtualized operations including (i) controlling virtualized operations conducted on the object associated with content received over a network and (ii) monitoring the virtualized operations conducted on the object.

27. The electronic device of claim 19, wherein the characteristics associated with anomalous behavior comprises at least one of unusual network transmissions from the electronic device and unusual changes in performance by the electronic device.

\* \* \* \* \*